US009944204B2

(12) United States Patent
Salvia, III et al.

(10) Patent No.: US 9,944,204 B2
(45) Date of Patent: Apr. 17, 2018

(54) REAR SEAT HAVING TWO INDEPENDENT MODES

(71) Applicant: Toyota Motor Engineering & Manufacturing North America, Inc., Erlanger, KY (US)

(72) Inventors: John J. Salvia, III, Ann Arbor, MI (US); Christopher M. Vargo, Plymouth, MI (US); Vasudeva S. Murthy, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 86 days.

(21) Appl. No.: 14/990,041

(22) Filed: Jan. 7, 2016

(65) Prior Publication Data
US 2017/0197526 A1 Jul. 13, 2017

(51) Int. Cl.
*B60N 2/30* (2006.01)
*B60N 2/02* (2006.01)
*B60N 2/20* (2006.01)
*B60N 2/235* (2006.01)
*B60N 2/22* (2006.01)

(52) U.S. Cl.
CPC ............ *B60N 2/206* (2013.01); *B60N 2/02* (2013.01); *B60N 2/2227* (2013.01); *B60N 2/235* (2013.01); *B60N 2/309* (2013.01); *B60N 2/3065* (2013.01)

(58) Field of Classification Search
None
See application file for complete search history.

(56) References Cited

U.S. PATENT DOCUMENTS

| 2,826,241 | A | * | 3/1958 | Himka | B60N 2/20 296/65.09 |
| 2,926,948 | A | * | 3/1960 | Koplin | B60N 2/3011 296/66 |
| 3,311,405 | A | * | 3/1967 | Brennan | B60N 2/3011 296/66 |
| 3,924,891 | A | * | 12/1975 | Williams | B60N 2/02 248/429 |
| 4,636,003 | A | * | 1/1987 | Siebler | B60N 2/3011 297/336 |
| 6,000,742 | A | * | 12/1999 | Schaefer | B60N 2/3011 296/65.09 |
| 6,079,763 | A | * | 6/2000 | Clemente | B60N 2/3011 248/430 |
| 6,183,033 | B1 | * | 2/2001 | Arai | B60N 2/3013 296/65.09 |

(Continued)

*Primary Examiner* — Joshua J Michener
*Assistant Examiner* — Kyle J. Walraed-Sullivan
(74) *Attorney, Agent, or Firm* — Christopher G. Darrow; Darrow Mustafa PC

(57) ABSTRACT

A seat for a vehicle is provided. The seat includes a seat base and a seat back coupled to the seat base so as to be rotatable with respect to the seat base about a seat back rotation axis. The seat also includes a first linkage having a first link rotatably coupled to the seat back at a first connection and a second link rotatably coupled to the seat base at a second connection. The first link is also rotatably coupled to the second link at a third connection. The third connection is structured to be movable with respect to the seat base responsive to rotation of the seat back about the rotation axis.

17 Claims, 5 Drawing Sheets

(56) References Cited

U.S. PATENT DOCUMENTS

| | | | |
|---|---|---|---|
| 6,520,581 B1* | 2/2003 | Tame | B60N 2/206 296/65.01 |
| 6,601,900 B1* | 8/2003 | Seibold | B60N 2/0292 296/65.05 |
| 7,134,725 B2* | 11/2006 | Hofmann | B60N 2/2245 296/65.01 |
| 7,188,883 B2* | 3/2007 | Van Dyk | B60N 2/3031 296/65.01 |
| 7,300,090 B2* | 11/2007 | Rana | B60N 2/3075 296/65.05 |
| 8,616,642 B2* | 12/2013 | Sung | B60N 2/3013 297/334 |
| 8,931,844 B2* | 1/2015 | Line | B60N 2/2356 297/340 |
| 9,290,116 B2* | 3/2016 | Teufel | B60N 2/366 |
| 2003/0209932 A1* | 11/2003 | Brush | B60N 2/3011 297/378.1 |
| 2004/0056521 A1* | 3/2004 | Kayumi | B60N 2/01 297/334 |
| 2004/0104590 A1* | 6/2004 | Kikuchi | B60N 2/01583 296/65.03 |
| 2004/0251705 A1* | 12/2004 | Tame | B60N 2/206 296/65.09 |
| 2006/0033373 A1* | 2/2006 | Kammerer | B60N 2/0292 297/378.1 |
| 2009/0001795 A1* | 1/2009 | Homier | B60N 2/22 297/341 |
| 2009/0146477 A1* | 6/2009 | Yamada | B60N 2/3011 297/354.1 |
| 2009/0152888 A1* | 6/2009 | Zelmanov | B60N 2/206 296/65.09 |
| 2009/0167068 A1* | 7/2009 | Yamagishi | B60N 2/12 297/340 |
| 2009/0256379 A1* | 10/2009 | Yamada | B60N 2/22 296/65.08 |
| 2009/0309383 A1* | 12/2009 | Teufel | B60N 2/045 296/65.13 |
| 2009/0322134 A1* | 12/2009 | Yamada | B60N 2/22 297/324 |
| 2010/0052389 A1* | 3/2010 | Holdampf | B60N 2/22 297/316 |
| 2010/0052390 A1* | 3/2010 | Dagcioglu | B60N 2/3011 297/324 |
| 2010/0084903 A1* | 4/2010 | Kammerer | B60N 2/12 297/329 |
| 2010/0133871 A1* | 6/2010 | Matsumoto | B60N 2/22 296/65.18 |
| 2010/0244524 A1* | 9/2010 | Kumazaki | B60N 2/12 297/341 |
| 2010/0295353 A1* | 11/2010 | Tame | B60N 2/3011 297/340 |
| 2011/0037304 A1* | 2/2011 | Kammerer | B60N 2/12 297/340 |
| 2011/0043024 A1* | 2/2011 | Kokubo | B60N 2/0232 297/378.1 |
| 2011/0049925 A1* | 3/2011 | Champ | B60N 2/01583 296/65.09 |
| 2011/0080027 A1* | 4/2011 | Nakao | B60N 2/01583 297/311 |
| 2011/0127822 A1* | 6/2011 | Moegling | B60N 2/12 297/378.12 |
| 2011/0140485 A1* | 6/2011 | Macmanus | B60N 2/06 297/216.1 |
| 2011/0316317 A1* | 12/2011 | Sprenger | B60N 2/206 297/344.1 |
| 2013/0001999 A1* | 1/2013 | Sasaki | B60N 2/01516 297/378.1 |
| 2013/0207411 A1* | 8/2013 | Holzhueter | B60N 2/36 296/65.09 |
| 2013/0313867 A1* | 11/2013 | Kuno | B60N 2/62 297/83 |
| 2013/0320729 A1 | 12/2013 | Cooley et al. | |
| 2014/0238188 A1* | 8/2014 | Ito | B60N 2/0228 74/664 |
| 2015/0108813 A1* | 4/2015 | Muller | B60N 2/2209 297/362.11 |
| 2015/0183344 A1* | 7/2015 | Kienke | B60N 2/167 297/344.1 |
| 2016/0304010 A1* | 10/2016 | Ecker | B60N 2/3031 |
| 2016/0311347 A1* | 10/2016 | Ecker | B60N 2/3013 |

* cited by examiner

REAR SEAT HAVING TWO INDEPENDENT MODES

TECHNICAL FIELD

The present disclosure relates to a vehicle seat assembly and, more particularly, to a seat assembly with a configuration that is changeable into various configurations to provide enhanced access to surrounding areas of a vehicle cabin and also to provide a relatively horizontal support surface for cargo transport.

BACKGROUND

It is sometimes desirable for a vehicle user to be able to move and/or fold a vehicle seat, to improve access to portions of the vehicle interior or to facilitate cargo transport. Thus, an ongoing need exists for vehicle seat structures which enable rapid and easy movement and/or reconfiguration of the seat according to the needs of a user.

SUMMARY

In one aspect of the embodiments described herein, a seat for a vehicle is provided. The seat includes a seat base and a seat back coupled to the seat base so as to be rotatable with respect to the seat base about a seat back rotation axis. The seat also includes a first linkage having a first link rotatably coupled to the seat back at a first connection and a second link rotatably coupled to the seat base at a second connection. The first link is also rotatably coupled to the second link at a third connection. The third connection is structured to be movable with respect to the seat base responsive to rotation of the seat back about the rotation axis.

In another aspect of the embodiments described herein, a vehicle seat is provided. The seat includes a seat base, a seat back coupled to the seat base so as to be rotatable about a seat back rotation axis, and a first linkage. The first linkage includes a first link rotatably coupled to the seat back at a first connection and a second link rotatably coupled to the seat base at a second connection, the first link also being rotatably coupled to the second link at a third connection. A seat bottom is rotatably coupled to the first link at a fourth connection located between the first connection and the third connection. A seat bottom latch mechanism is operatively coupled to the seat bottom and is engageable with the seat bottom to prevent rotation of the seat bottom. A seat back recline mechanism is operatively coupled to the seat back and to the seat base. The recline mechanism is operable to permit rotational adjustment of the seat back. A stopper is operatively coupled to the seat base and is engageable with the recline mechanism so as to prevent full forward rotation of the seat back during operation of the recline mechanism. The stopper is also disengageable from the recline mechanism so as to enable full forward rotation of the seat back during operation of the recline mechanism. A tip-up actuator is operatively coupled to the recline mechanism so as to operate the recline mechanism when the tip-up actuator is operated by a user. The tip-up actuator is also operatively coupled to the latch mechanism so as to disengage the latch mechanism when the tip-up actuator is operated by a user, thereby enabling rotation of the seat bottom. A fold-down actuator is operatively coupled to the recline mechanism so as to operate the recline mechanism when the fold-down actuator is operated by a user, and is also operatively coupled to the stopper so as to disengage the stopper when the fold-down actuator is operated by the user, thereby enabling full forward rotation of the seat back.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
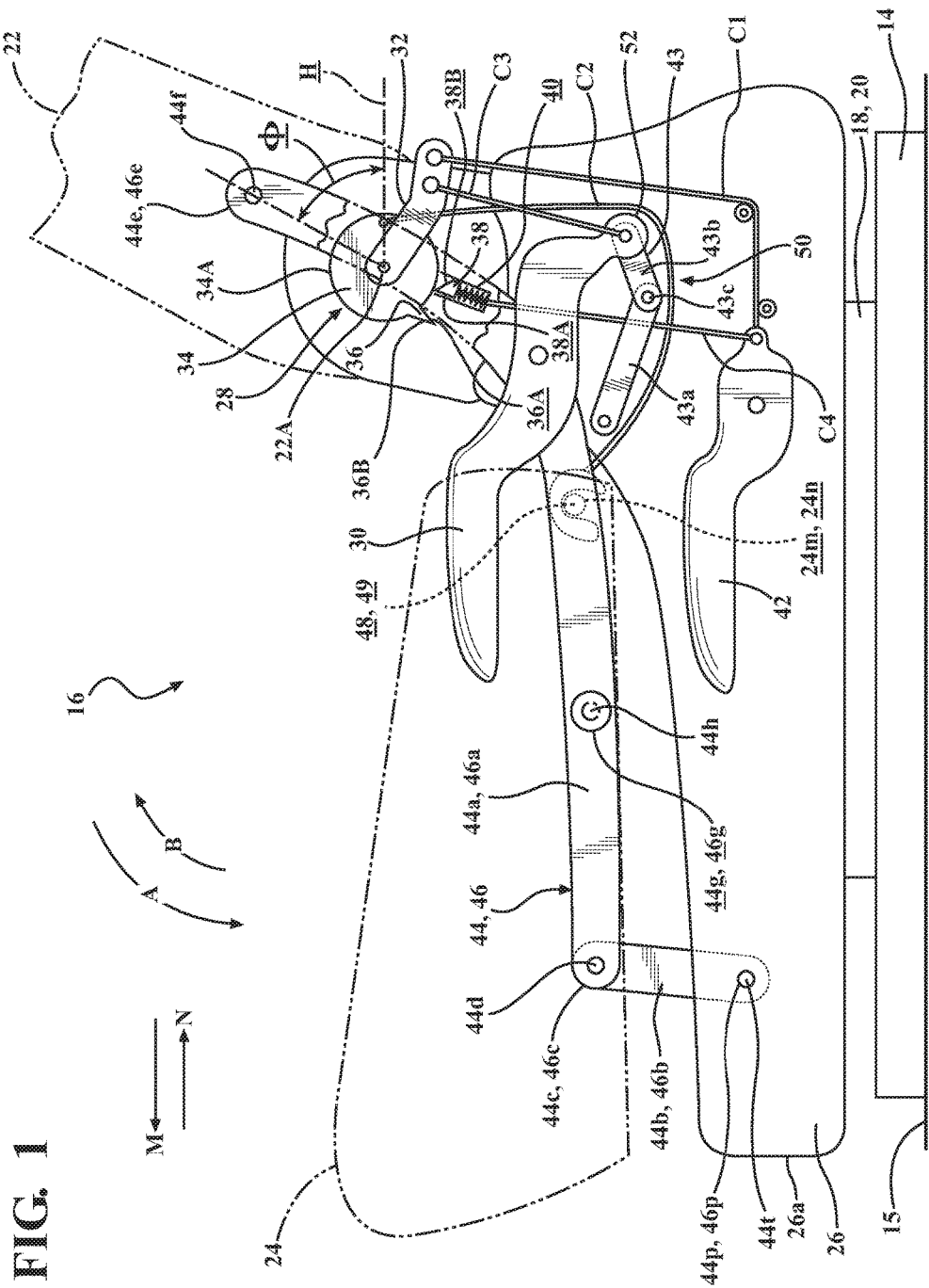
FIG. 1 is a side view of a reconfigurable vehicle seat in accordance with one embodiment described herein, arranged in an occupant-use configuration.

This disclosure describes an improved vehicle passenger seat. The seat is configurable into any one of three independent modes, an occupant-use mode, a tip-up mode, and a fold-down mode. The occupant-use mode is for use by an occupant seated in a normal fashion within the vehicle. In the tip-up mode, the seat bottom and seat back are folded toward each other into substantially upright or vertical orientations, to facilitate access to a portion of the vehicle interior residing behind the seat. In the fold-down mode, the seat bottom and seat back are folded toward each other into substantially horizontal orientations, to provide a flat surface to facilitate cargo loading and transport. The seat bottom is connected to the seat back and to a base of the seat by a pair of linkages, with one linkage arranged on each side of the seat. The linkages guide movement of the seat bottom with respect to the seat back and base during conversion between the three seat modes.

Conversion from the occupant-use mode to the tip-up mode is performed by actuating a tip-up actuator. The tip-up actuator is structured to operate the seat back recline mechanism, enabling forward rotation of the seat back into an upright position and until a hard stop is engaged to prevent further forward rotation. The tip-up actuator is also structured to simultaneously operate a second mechanism which enables rotation of the seat bottom into an upright position.

Conversion from the occupant-use mode to the fold-down mode is performed by actuating a fold-down actuator, which is separate from the tip-up actuator. The fold-down actuator is structured to simultaneously disable the hard stop preventing full forward rotation of the seat back and to operate the seat back recline mechanism, thereby enabling rotation of the seat back forward into a full folded down position. Operation of the linkage during full forward rotation of the seat back causes the seat bottom to move downwardly relative to its occupant-use position. This maximizes the space available for forward rotation of the seat back and facilitates location of the seat back rotation axis as low as possible, to maximize vertical cargo space within the vehicle when the seat back is folded forward.

The seat structure described herein provides a quick and convenient method of reconfiguring the seat into any one of multiple independent usage modes by employing a single actuator for each mode.

In the embodiments described herein, the terms "forward", "forwardly" and "forward-most" are understood to signify a direction toward a front of the vehicle or from the seat back toward a front-edge of the seat bottom. Similarly, the terms "rearward", "rearwardly" and "rear-most" are understood to signify a direction toward a rear of the vehicle or from the front-edge of the seat bottom toward the seat back. Also, in cases where two or more components are described to be "rotatably coupled to" or "rotatably connected to" each other, one or more of these components may be rotated with respect to the other component(s).

FIGS. 1-4 show a secondary passenger support for use in a vehicle (not shown) in accordance with an embodiment of the present disclosure. For the purposes described herein, a "secondary passenger support" is defined as a passenger support residing behind any front passenger support of the vehicle. Thus, a secondary passenger support may be a middle-row passenger support or a back-row passenger support of the vehicle, for example. A foundation frame 14 is coupled to a floor 15 of the vehicle, and a secondary passenger support in the form of a vehicle seat 16 is mounted on the foundation frame 14. Foundation frame 14 is structured to support vehicle seat 16 above vehicle floor 15 and behind front-row passenger seats (not shown). Vehicle seat 16 is mounted in a known manner (for example, on rails 18 and 20) so as to be movable relative to foundation frame 14. Vehicle seat is also reconfigurable as described herein between a first mode or configuration, a second mode or configuration, and a third mode or configuration.

Figure 2:
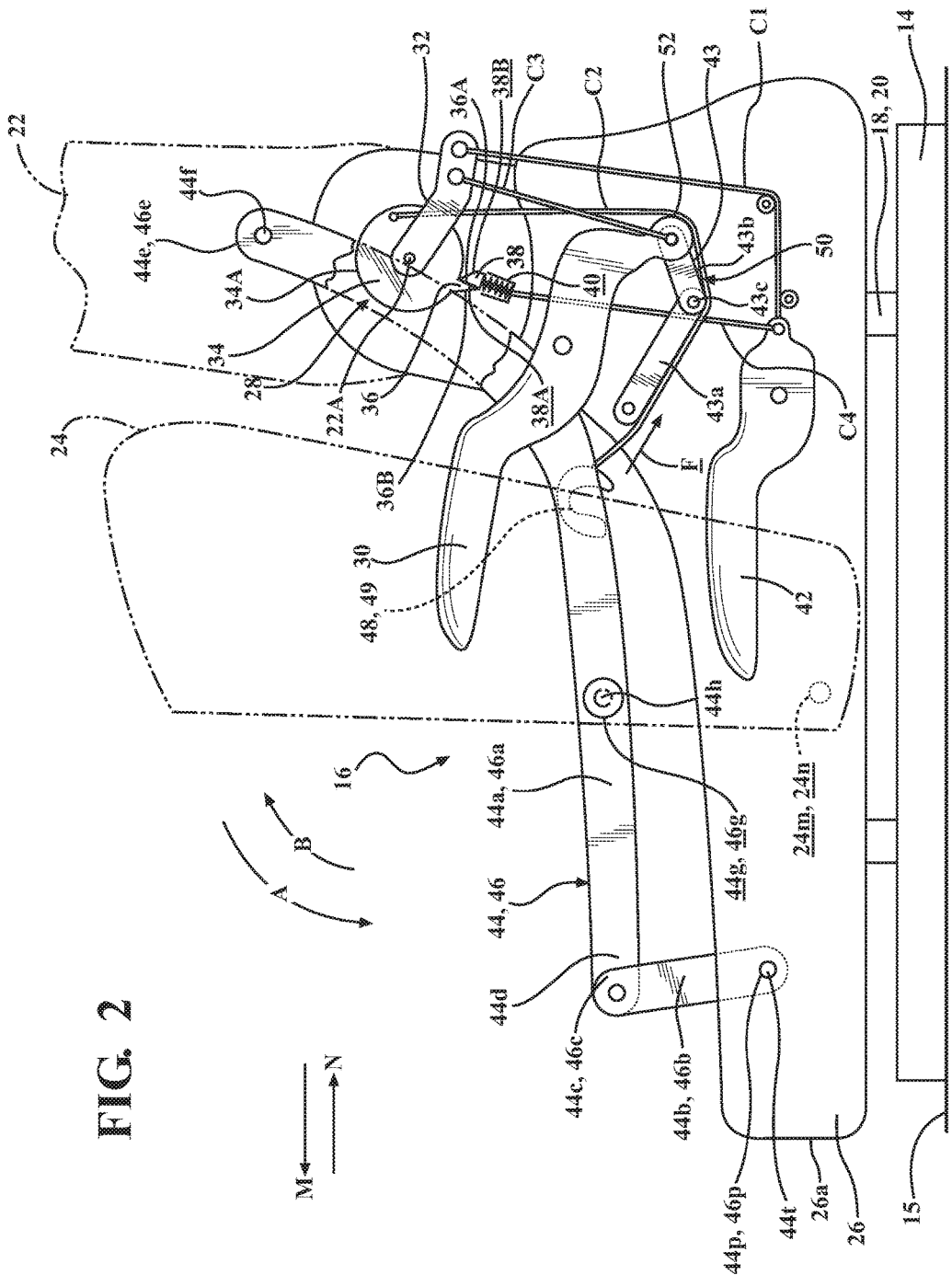
FIG. 2 is a side view of the seat shown in FIG. 1, reconfigured into a tip-up configuration.
Figure 3:
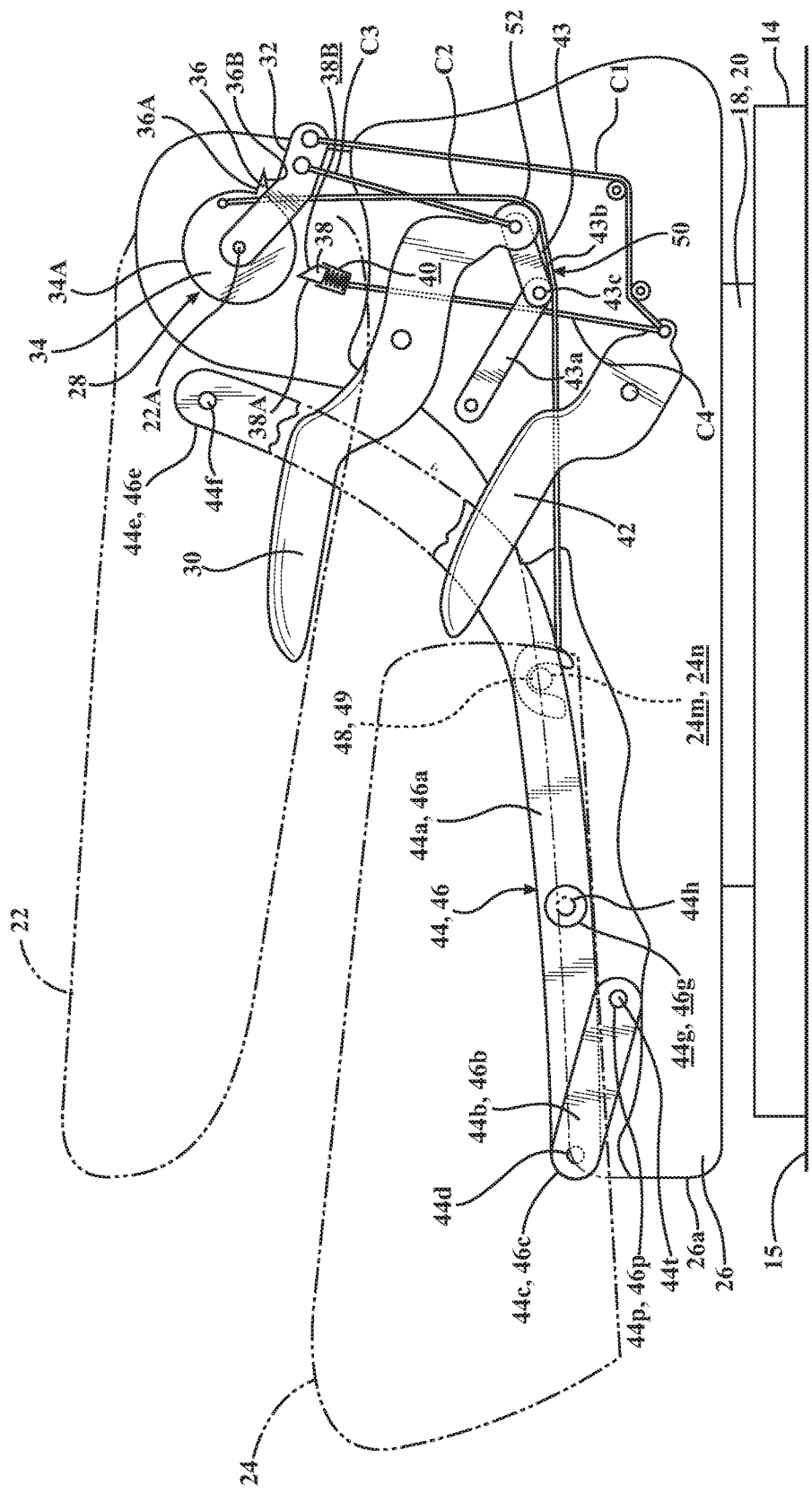
FIG. 3 is a side view of the seat shown in FIG. 1, reconfigured into a fold-down configuration.

In a particular embodiment, the first configuration is a normal vehicle occupant-use configuration for supporting a passenger during movement of the vehicle. A representative example of the seat in the first configuration is shown in FIG. 1. The second configuration is a "tip-up" folded configuration, a representative example of which is shown in FIG. 2. The tip-up configuration is designed for easing occupant entry into (and exit from) a back-row passenger support (not shown), or otherwise for facilitating access to a portion of the vehicle interior residing behind the vehicle seat 16. In the tip-up configuration, the seat back 22 is biased forward of its position in the occupant-use configuration (FIG. 1) and the seat bottom 24 is biased backward and upward with respect to its orientation in the occupant-use configuration. The third configuration is a "fold down" folded configuration, a representative example of which is shown in FIG. 3. In the fold-down configuration, the seat back 22 and bottom 24 are substantially horizontal, thereby providing a flat surface to facilitate cargo loading and transport.

Referring to FIG. 1, foundation frame 14 includes a first rail 18 and a second rail 20. Each of rails 18, 20 is operatively coupled to one or more complementary features provided on seat base 26 (described below), and is structured to support vehicle seat 16 for movement therealong in a manner known in the art.

Vehicle seat 16 includes a seat back 22, a seat bottom 24, and a seat base 26 operatively coupled to each other and movable with respect to each other so that vehicle seat 16 can be configured into any of the three usage configurations previously described. Seat base 26 is operatively coupled to rails 18 and 20 of foundation frame 14 for forward and rearward movement along foundation frame 14. In the embodiment shown, the seat base 26 is coupled to the rails for sliding movement along the foundation frame, in a manner known in the art.

Referring now to FIG. 1, seat back 22 is rotatably coupled to base 26 so as to facilitate rotation of the seat back about a seat-back pivot axis 22A, between a fully reclined configuration (not shown) and the folded-down configuration shown in FIG. 3. In the fully reclined configuration of seat back 22, an angle Φ formed between the seat back 22 and a horizontal plane H extending from the seat back pivot axis 22A toward a rear of the vehicle is minimized. In the embodiments described herein, seat back 22 is also spring loaded so as to bias rotation of the seat back 22 in the direction indicated by arrow "A" when a seat back recline mechanism 28 (described below) is operated.

Figure 5:
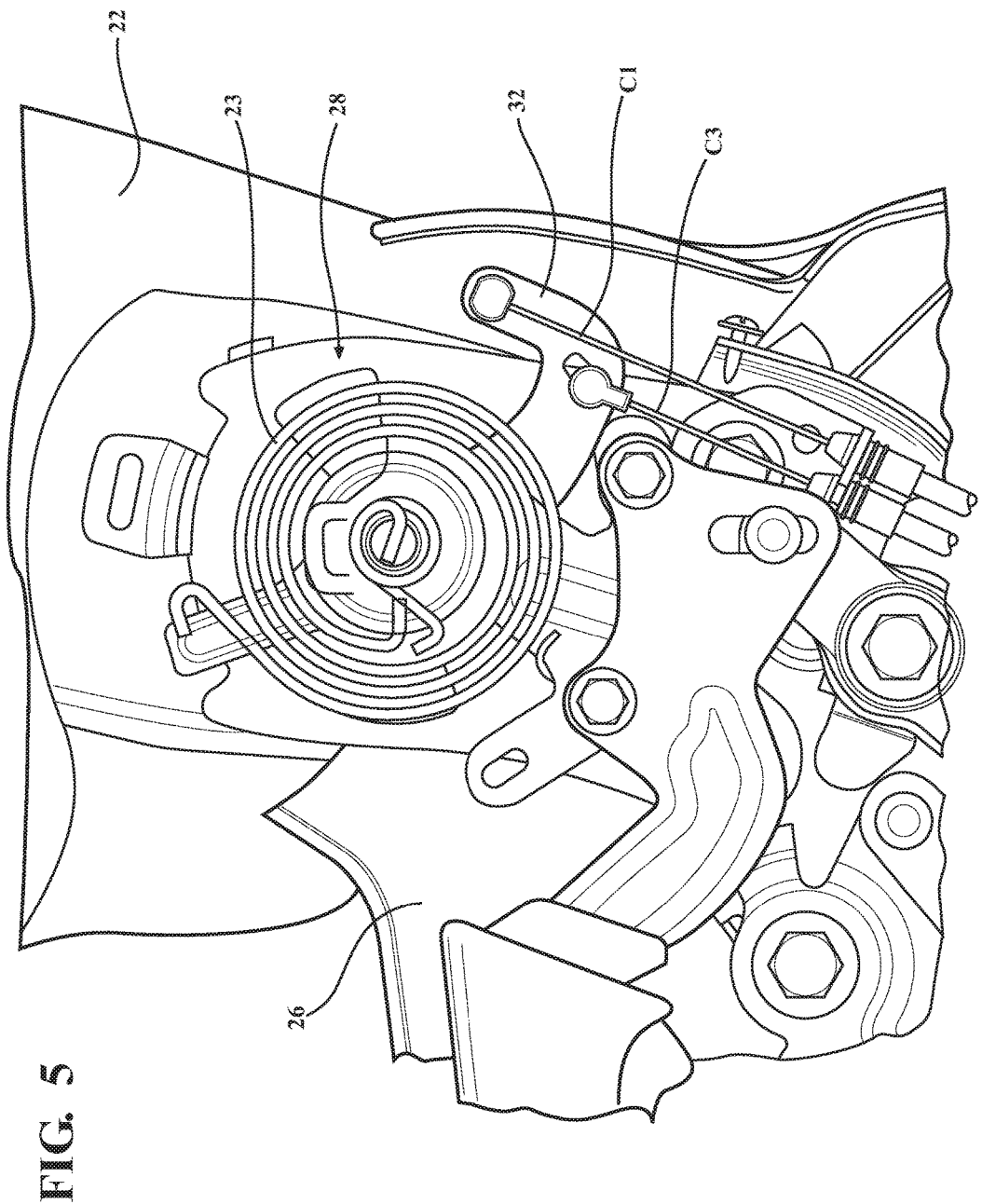
FIG. 5 is a cross-sectional detail view of a portion of the seat configuration shown in FIG. 1, prior to reconfiguration of the seat into either the fold-down mode or the tip-up mode.

A conventional seat back recline mechanism 28 is coupled to the seat back 22. In a manner known in the art, in a normal operational mode, recline mechanism 28 may be operated by an actuation lever (not shown) to permit rotational adjustment of the seat back 22 to any one of a number of discrete, predetermined orientations. The recline mechanism is also actuatable to lock the seat back in a desired orientation during normal vehicle operation, or otherwise to prevent rotation of the seat back about axis 22A. As known in the art, the seat back may be locked in the desired orientation by releasing the actuation lever when the seat back has been oriented at the desired angle. Referring to FIGS. 1 and 5, in a manner known in the art, a spring 23 of the recline mechanism biases rotation of the seat back 22 in the direction indicated by arrow "A" when the actuation lever is operated to release the seat back from a locked condition. Thus, the actuation lever operates the recline mechanism to permit seat back rotation in a conventional usage mode (i.e., when neither the tip-up or fold down seat modes are desired).

In the embodiment shown in FIGS. 1-5, the recline mechanism 28 includes a pawl 34 with a tooth 36 formed along an edge 34A thereof. The pawl 34 is coupled to the seat back 22 so as to rotate with the seat back. Tooth 36 has a stopper face 36A structured to engage a stopper 38 (described in greater detail below) so as to prevent rotation of the pawl 34 and seat back 22 in direction "A". Tooth 36 also has a ramped face 36B structured to permit the stopper 38 to slide therealong when the pawl 34 rotates in a direction "B" opposite direction "A". Stopper 38 has a stop face 38A and a sloped sliding face 38B opposite the stop face. Stop face 38A is arranged with respect to tooth stopper face 36A so that the stopper face 36A will abut stop face 38A when pawl 36 is rotated in direction "A", thereby preventing further rotation of the seat back in direction "A" until stopper 38 is retracted into cavity 40. Sliding face 38B is sloped at an angle with respect to tooth ramped face 36B such that, when pawl 34 rotates in direction "B" and sliding face 38B engages ramped face 36B, surfaces 36B and 38B slide with respect to each other, forcing stopper 38 deeper into cavity 40 to permit the tooth 36 to move past cavity 40. Conversely, rotation of the pawl 34 in direction "A" will cause the tooth stopper face 36A to abut stop face 38A when the stopper 38 is in an engagement position (as shown in FIG. 2). When pawl 34 rotates in direction "B", the stopper 38 may slide along the edge of the pawl, along the ramp 36B to the edge of the stopper face 36A and down the stopper face 36A to re-engage the pawl edge 34A.

The recline mechanism 28 also includes a lever 32 rotatable with respect to seat back 22 and separate from the normal recline mechanism actuation lever (not shown), to enable operation of the recline mechanism independently of the normal recline mechanism actuation lever. Lever 32 is also coupled to cables C1 and C3 as described below. Operation of lever 32 by tensioning of one of cables C1 or C3 enables reconfiguration of the seat into an associated one of the fold-down and tip-up modes, in the manner described herein.

In the embodiments described herein, the recline mechanism 28 may be operated by manipulation of a tip-up actuator 30 operatively coupled by a cable, a linkage, or any other suitable method to the recline mechanism lever 32. This operation of the recline mechanism 28 enables the seat back 22 to rotate freely about axis 22A. In the embodiment shown in FIGS. 1-5, tip-up actuator 30 is in the form of a lever rotatably mounted on the seat base 26 and operatively coupled to the recline mechanism lever 32 by a cable C3. In the embodiment shown in FIGS. 1-5, tip-up actuator 30 is also structured so as to engage and tension a latch-release cable C2 during rotation of the actuator 30, in a manner described in greater detail below.

Stopper 38 is positioned within a cavity 40 formed in the seat base 26. Stopper 38 and cavity 40 are structured such that the stopper is movable within the cavity between an engagement position (in which the stopper is positioned to so as to engage tooth 36, as shown in FIG. 2) and a disengagement position (shown in FIG. 3) in which the stopper is prevented from engaging the tooth. The stopper 38 is spring-loaded so as to bias the stopper toward the engagement position. The stopper is also structured to be slidable along the edge 34A of pawl 34 when not engaged with the tooth 36. In its normal, spring-biased engagement configuration, the stopper 38 is positioned so as to permit the seat back 22 to rotate forward (in direction "A") a predetermined amount before engaging tooth 36, after the seat back is released for rotation by operation of the recline mechanism. As seen in FIGS. 1 and 2, when seat back 22 has been rotated in direction "A" to a configuration where tooth 36 engages stopper 38, further rotation of the seat back 22 in direction "A" is prevented until the stopper 38 is disengaged from the tooth 36. Thus, when in its engagement position, the stopper prevents full forward rotation of the seat back 22. When the stopper 38 is in its disengagement position, full forward rotation of the seat back is enabled.

The stopper 38 is moved between its engagement and disengagement positions by operation of a fold-down actuator 42, which is operatively coupled to the stopper. In the embodiment shown in FIGS. 1-4, fold-down actuator 42 is in the form of a lever rotatably mounted on the seat base 26 and attached to the stopper 38 by a cable C4. Alternatively, the fold-down actuator 42 may be operatively coupled to the stopper using any of a variety of other methods, for example, a suitable linkage.

Referring to FIGS. 1 and 3, rotation of the fold-down actuator 42 in the direction indicated by arrow "B" tensions the cable C4, thereby moving the stopper 38 within cavity 40 to the disengagement position and releasing the seat back 22 for further forward rotation. Fold-down actuator 42 is also operatively coupled to the recline mechanism lever 32 (by a cable, a linkage, or any other suitable method) so as to enable operation of the mechanism 28 by rotation of the fold-down actuator in direction "B" in a manner similar to operation of the recline mechanism by the tip-up actuator. In the embodiment shown in FIGS. 1-5, fold-down actuator 42 is operatively coupled to the recline mechanism 28 by a cable C1. Thus, the recline mechanism 28 may be operated by actuating either the fold-down actuator 42 alone or the tip-up actuator 30 alone.

Figure 4:
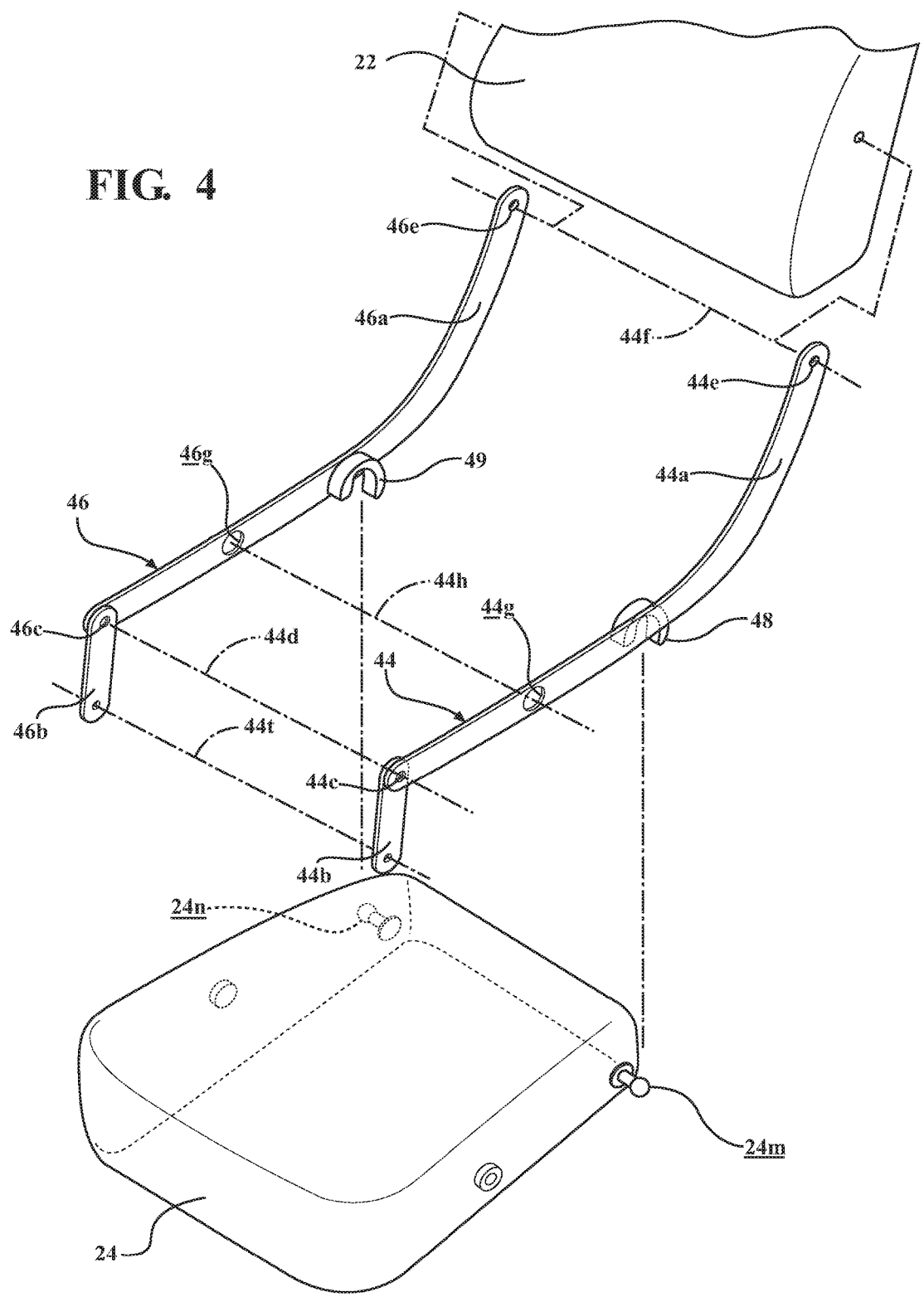
FIG. 4 is an exploded perspective view of a portion of the vehicle seat of FIG. 1.

Referring to FIGS. 1-4, a linkage is positioned along each side of the seat 16 to operatively couple the seat base 26, seat back 22, and seat bottom 24 to each other. FIGS. 1 and 4 show a first linkage 44 positioned along a left side of the seat 16 from the perspective of an occupant sitting in the seat. First linkage 44 has a first rigid link 44a and a second rigid link 44b operatively coupled to the first link 44a at a linkage connection 44c so as to be rotatable with respect to the first link about an axis 44d. First link 44a is also operatively coupled to the seat back 22 at a location 44e so as to be rotatable with respect to the seat back 22 about an axis 44f. First link 44a is also operatively coupled to the seat bottom 24 at a location 44g so as to enable rotation of seat bottom 24 with respect to the first link about an axis 44h. Second link 44b is operatively coupled to the first link 44a at linkage connection 44c and is also operatively coupled to seat base 26 at a connection location 44p so as to be rotatable with respect to the seat base 26 about an axis 44t.

Similarly, a second linkage 46 is positioned along the opposite or right side of the seat. Second linkage 46 has a first rigid link 46a and a second rigid link 46b operatively coupled to the first link at a linkage connection 46c so as to be rotatable with respect to the first link about axis 44d. First link 46a is operatively coupled to the seat back 22 at a location 46e so as to be rotatable with respect to the seat back 22 about axis 44f. First link 46a is also operatively coupled to the seat bottom 24 at a location 46g so as to enable rotation of seat bottom 24 with respect to the first link 46a about axis 44h. Second link 46b is operatively coupled to the first link 46a at linkage connection 46c and is also operatively coupled to seat base 26 at a connection location 46p so as to be rotatable with respect to the seat base 26 about axis 44t.

Any of links 44a, 44b, 46a, and 46b may have any configuration suitable for incorporation into a size envelope dictated by design requirements, and for controlling the motions of the seat back 22 and seat bottom 26 as described herein. As seen in FIGS. 1-4, links 44a, 44b and 46a, 46b are structured and connected to each other such that forward rotation of seat back 22 about axis 22A produces a forward movement of linkage connections 44c, 46c, in a manner described in greater detail below.

Referring again to FIGS. 1-4, and as stated previously, seat bottom 24 is attached to the remainder of the seat 16 by rotatably coupling the seat bottom 24 to first linkage first link 44a and second linkage first link 46a. Seat bottom 24 is also spring-loaded with respect to one or more of linkages 44 and 46 so as to bias the seat bottom 24 toward rotation in the direction indicated by arrow "B". In the occupant-use mode (FIG. 1) and the fold-down mode (FIG. 3) of the seat, this rotation is prevented by a spring-loaded latch mechanisms 48 and 49 which operatively couple seat bottom 24 to either (or both) of first linkage first link 44a and second linkage first link 46a, respectively. Latch mechanism 48 is configured to engage a pin 24m extending from the seat bottom 24, and latch mechanism 49 is configured to engage a pin 24n extending from the seat bottom 24. When engaged, the latch mechanisms 48 and 49 lock the seat bottom 24 into its normal occupant-use orientation with respect to the linkages 44 and 46, thereby preventing rotation of the seat bottom 24 with respect to the first and second linkage first links.

A seat bottom latch disengagement mechanism (generally designated 50) is structured to be operable to disengage the latch mechanisms 48 and 49, thereby enabling spring-loaded rotation of the seat bottom 24 into the tip-up mode shown in FIG. 2. In the embodiment shown in FIGS. 1-4, the latch disengagement mechanism 50 includes a cable C2 connecting the latch mechanisms 48 and 49 to the pawl 34. A portion of cable C2 extending between the pawl 34 and the latch mechanisms 48 and 49 is split or bifurcated at cable junction box (not shown) into a first branch C2a connecting to latch mechanism 48, and a second branch C2b (not shown) connecting to latch mechanism 49. Such junction boxes are well-known in the art. The junction box enables both of latches 48 and 49 to be released by actuation of cable C2 at a single location, where the cable is attached to pawl 34 (i.e., by rotating pawl 34 to tension cable C2 as described herein, both of latch mechanisms 48 and 49 can be actuated simultaneously).

The latch disengagement mechanism 50 also includes an actuatable tensioning mechanism operable to tension the cable C2 during operation of the tip-up actuator 30 and subsequent rotation of the pawl 34. In the embodiment shown, the tensioning mechanism is in the form of a projection 52 formed on the tip-up actuator 30, and a tensioning linkage 43 extending between the projection 52 and the seat base 26. Tensioning linkage 43 has a first link 43a and a second link 43b rotatably coupled to link 43a and at a connection 43c. Linkage 43 is structured so that connection 43c moves in a direction generally away from a rotational axis of tip-up actuator 30 when the actuator is rotated in direction "B". Linkage 43 is also structured so that cable C2 extends along the lowermost edges of projection 52, link 43b, connection 43c and link 43a as shown in FIGS. 2 and 3, thereby removing the slack from and tensioning the cable when the tip-up actuator 30 is actuated. The tensioning of the cable C2 produced by forward rotation of the pawl 34 and engagement between the cable C2 and projection 52/linkage 43 combine to pull the portion of the cable coupled to the latch mechanisms 48 and 49 in direction "F" (FIG. 2), thereby disengaging the latch mechanisms 48 and 49 and permitting seat bottom pins 24m and 24n to separate from the latch. The latch disengagement mechanism 50 is also structured such that, when this tensioning in the cable C2 is released (by rotation of the pawl 34 in direction "B" and/or by release of the spring-loaded tip-up actuator 30), the latch mechanisms 48 and 49 are able to re-engage pins 24m and 24n when seat bottom 24 is rotated in direction "A". The latch mechanisms 48 and 49 are structured so that when the disengagement mechanism 50 is not activated by tensioning of cable C2, the seat bottom 24 can simply be rotated manually in direction "A" to re-engage the latch mechanism. The latch mechanisms 48 and 49 then maintain the seat bottom 24 in its occupant-use configuration. The latch mechanisms 48 and 49 may be spring-loaded mechanisms or any other known or suitable mechanisms structured for coupling the seat bottom to the one or more of linkages 44, 46 to prevent rotation of the seat bottom 24 with respect to the linkages when engaged. The latch mechanisms 48 and 49 are also releasable or disengageable by the latch-release cable C2 when the cable is tensioned as described herein, to release the seat bottom for spring-loaded rotation into the tip-up configuration.

Referring to FIGS. 1 and 2, when vehicle seat 16 moves from the occupant-use configuration shown in FIG. 1 to the tip-up configuration, seat back 22 is pivoted forward from the occupant-use position, which is generally upright in this example, to a tilted-forward position. By moving seat back 22 from the occupant-use position to the tilted-forward position, seat back 22 moves from forming an angle greater than or equal to about 90 degrees with the portion of foundation frame 14 in front of the seat back, to forming an acute angle with foundation frame 14. In addition, seat bottom 24 is pivoted upwardly from an occupant-use position, in which it is extending generally horizontally away from seat back 22, to a folded-up position in which it is extending generally along seat back 22. By pivoting seat bottom 24 from the occupant-use configuration to the tip-up configuration, a front edge 24a of seat bottom 24 is moved from a first position in front of a front edge 26a of seat base 42 to a second position behind front edge 26a of seat base 26 thereby allowing vehicle seat 16 to move or slide further forward than if seat base 26 remained in the occupant-use position. Seat base 26 is then slidable forward from any of a series of relatively rearward positions to a relatively forward position.

To convert from the occupant-use configuration shown in FIG. 1 to the tip-up configuration shown in FIG. 2, the tip-up actuator 30 is rotated in direction "B". Rotation of the tip-up actuator 30 in direction "B" simultaneously positions the projection 52 and the linkage connection 43c in position for tensioning cable C2 and operates the recline release mechanism 28 as previously described, enabling spring loaded forward rotation of the seat back 22 until tooth 36 engages stopper 38. Seat back 22 is now in its tip-up configuration. The forwardly rotating seat back 22 also pulls forward on the portion of the cable C2 attached to the pawl 36, thereby increasing tension in cable C2, which engages and is tensioned by contact with projection 52 and linkage connection 43c. The resulting added tension in the cable C2 causes the latch mechanisms 48 and 49 to become disengaged, thereby enabling spring-loaded rotation of the seat bottom 24 in direction "B" and into its tip-up configuration as shown in FIG. 2. At the same time, forward motion of seat back 22 forces first linkages 44a, 46a forward, which also moves forward seat bottom connection locations 44g, 46g and the attached seat bottom 24. Thus, the seat is brought automatically from the occupant-use configuration into the tip-up configuration shown in FIG. 2 simply by rotating the tip-up actuator 30 in direction "B". After the seat 16 has reached the tip-up configuration, the tip-up actuator 30 may be released. Finally, the user can move or slide seat base 26 along foundation frame 14 from a relatively rearward position to a relatively forward or forward-most position as suggested by arrow M in FIG. 1, thereby maximizing the available space behind the seat.

To return the seat from the tip-up configuration to the occupant-use configuration, the user can move or slide seat base 26 along foundation frame 14 from the relatively forward position to a relatively rearward position as suggested by arrow N in FIG. 1, thereby increasing the space available for unfolding of the seat. Seat back 22 is then rotated in direction "B" by the user until the recline mechanism locks the seat back in a forward-most one of its predetermined locking positions. Seat bottom 24 is then rotated forward in direction "A" to its occupant-use orientation to re-engage the latch mechanisms 48 and 49, thereby locking the seat bottom 24 in the occupant-use orientation.

To convert from the occupant-use configuration shown in FIG. 1 to the fold-down configuration shown in FIG. 3, the user can move or slide seat base 26 along foundation frame 14 from a relatively forward position to a relatively rearward or rear-most position as suggested by arrow N in FIG. 1, thereby maximizing the available space in front of the seat. The fold-down actuator 42 is then rotated in direction "B". Rotation of the fold-down actuator 42 in direction "B" simultaneously operates the recline mechanism 28 by tensioning of cable 1 as previously described and removes stopper 38 from a position in which it can engage tooth 36. This enables tooth 36 to rotate past the stopper cavity 40, enabling full forward rotation of the seat back 22, as shown in FIG. 3. Spring-loaded forward rotation of the seat back can now proceed without user intervention, until the seat back resides in the configuration shown in FIG. 3. When the fold-down actuator 42 is released after rotation of tooth 36 past the stopper cavity 40, stopper 38 is slidable along pawl edge 34A as previously described. Because stopper 38 is biased in a direction toward pawl edge 34A by spring loading, the stopper will be in contact with pawl edge 34A whenever tension in cable C4 is released.

Forward rotation of seat back 22 produces an associated forward motion of first links 44a and 46a, which results in an associated rotation of connected second links 44b and 46b forwardly and downwardly. As the second links 44b and 46b rotate forwardly (in direction "A"), the link connections 44c and 46c move downwardly, also forcing seat bottom attachment locations 44g and 46g in a downward direction. As a result, the seat bottom 24 is also urged forwardly and downwardly with respect to its occupant-use position. This maximizes the space available for forward rotation of seat back 22 and facilitates location of the seat back rotation axis 22A as low as possible, to maximize vertical cargo space within the vehicle when the seat back is folded forward. In addition, because seat bottom latch release cable C2 is tensioned to disengage the latch mechanisms 48 and 49 only when tip-up actuator 30 is rotated to position tensioner 52, latch mechanisms 48 and 49 remains engaged with seat bottom 24 during reconfiguration of the seat to the fold-down mode. Thus, the latch mechanism prevents spring-loaded rotation of the seat bottom 24 out of its occupant-use orientation. Seat back 22 may be rotated until a rear surface 22R of the seat back resides in a substantially horizontal configuration, thereby providing a relatively flat surface for loading and transposition of cargo thereon. Thus, the seat may be converted from the occupant-use configuration to the fold-down configuration shown in FIG. 3 simply by rotating the fold-down actuator 42 in direction "B".

To return the seat from the fold-down configuration to the occupant-use configuration, a user rotates seat back 22 in direction "B" until the recline mechanism locks the seat back in a forward-most one of its predetermined locking positions. The seat back will then remain locked in this position until the recline mechanism is actuated using the normal use lever (not shown) or one of levers 30 and 42. As the seat 22 back rotates, stopper 38 slides along pawl edge 34A. Also, as pawl 34 rotates in direction "B", stopper 38 slides along edge 34A of the pawl, along the ramp 36B to the edge of the stopper face 36A and down the stopper face 36A to re-engage the pawl edge 34A. At the same time, operation of linkages 44 and 46 results in a rearward and upward motion of connected seat bottom 24, toward its occupant-use position as shown in FIG. 1.

In alternative embodiments, the recline mechanism 28, seat latch disengagement mechanism 50, and stopper mechanisms 38 can be operated electrically or automatically rather than manually, for example, by attaching the various actuating cables to one or more solenoids.

In view of the above, it is seen that the seat structures described herein enables the seat to be reconfigured from an occupant-use mode to either one of two independent alternative modes, a tip-up mode and a fold-down mode.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle seat comprising:
    a seat base;
    a seat back coupled to the seat base so as to be rotatable about a seat back rotation axis;
    a first linkage including a first link rotatably coupled to the seat back at a first connection, and a second link rotatably coupled to the seat base at a second connection, the first link being rotatably coupled to the second link at a third connection; and
    a seat bottom directly connected to the first link at a fourth connection, the seat bottom being rotatable about the fourth connection,
    wherein the third connection is structured to be movable with respect to the seat base responsive to rotation of the seat back about the seat back rotation axis.

2. The seat of claim 1 further comprising a seat bottom latch mechanism operatively coupled to the seat bottom and to the first linkage, wherein the seat bottom latch mechanism is structured to prevent rotation of the seat bottom with respect to the first link.

3. The seat of claim 2 further comprising a seat bottom latch disengagement mechanism structured to disengage the seat bottom latch mechanism so as to enable rotation of the seat bottom with respect to the first link.

4. A vehicle seat comprising:
    a seat base;
    a seat back coupled to the seat base so as to be rotatable about a seat back rotation axis; and
    a first linkage including a first link rotatably coupled to the seat back at a first connection and
    a second link rotatably coupled to the seat base at a second connection, the first link being rotatably coupled to the second link at a third connection, and
    a seat bottom rotatably coupled to the first link at a fourth connection,
    wherein the third connection is structured to be movable with respect to the seat base responsive to rotation of the seat back about the seat back rotation axis,
    the vehicle seat further comprising a seat bottom latch mechanism operatively coupled to the seat bottom and to the first linkage, wherein the seat bottom latch mechanism is structured to prevent rotation of the seat bottom with respect to the first link,
    the vehicle seat further comprising a seat bottom latch disengagement mechanism structured to disengage the seat bottom latch mechanism so as to enable rotation of the seat bottom with respect to the first link,
    the vehicle seat further comprising a tip-up actuator rotatably coupled to the seat base, wherein the seat bottom latch disengagement mechanism includes a cable operatively coupled to the seat bottom latch mechanism and to the seat back, and a tensioning linkage structured to be operable by the tip-up actuator to contact the cable so as to tension the cable when the tip-up actuator is rotated.

5. The seat of claim 1 further comprising a seat back recline mechanism operatively coupled to the seat back and to the seat base, the seat back recline mechanism being structured to permit rotational adjustment of the seat back, the seat back recline mechanism including a pawl structured to rotate with the seat back, the pawl having an outer edge and a tooth projecting from the outer edge.

6. The seat of claim 5 further comprising a stopper cavity formed in the seat base and a spring-loaded stopper positioned within the stopper cavity so as to be movable between an engagement position structured to engage the pawl during rotation of pawl, and a disengagement position in which the stopper is prevented from engaging the pawl during rotation of pawl.

7. The seat of claim 6 further comprising a fold-down actuator operatively coupled to the recline mechanism so as to operate the recline mechanism when the fold-down actuator is operated by a user, and wherein the fold-down actuator is also operatively coupled to the stopper so as to move the stopper into the disengagement position when the fold-down actuator is operated by the user.

8. The seat of claim 4 wherein the cable is operatively coupled to the seat bottom latch mechanism and to the seat back such that a forward rotation of the seat back tensions the cable.

9. The seat of claim 4 wherein the tip-up actuator is operatively coupled to the recline mechanism so as to operate the recline mechanism when the tip-up actuator is operated by a user, and wherein the tip-up actuator is also operatively coupled to the seat bottom latch mechanism so as to operate the seat bottom latch mechanism when the recline mechanism is operated by the user.

10. The seat of claim 8 wherein the cable is operatively coupled to the seat bottom latch mechanism and to the seat back such that tensioning of the cable produced by operation of the tip-up actuator and forward rotation of the seat back operates to disengage the seat bottom latch mechanism so as to enable rotation of the seat bottom with respect to the first link.

11. The seat of claim 1 wherein the third connection is structured to rotate about the second connection when the first connection is rotated about the seat back rotation axis.

12. The seat of claim 1 wherein the second link is structured to rotate about the second connection when the first connection is rotated about the seat back rotation axis.

13. The seat of claim 1 wherein the third connection is structured to move forwardly when the seat back rotates in a forward direction.

14. The seat of claim 1 wherein the second link is structured to rotate about the second connection when the seat back rotates in a forward direction.

15. A vehicle seat comprising:
a seat base;
a seat back coupled to the seat base so as to be rotatable about a seat back rotation axis;
a first linkage including a first link rotatably coupled to the seat back at a first connection and a second link rotatably coupled to the seat base at a second connection, the first link being rotatably coupled to the second link at a third connection;
a seat bottom directly coupled to the first link at a fourth connection, the seat bottom being rotatable about the fourth connection so as to be rotatable independently of the seat back;
a seat bottom latch mechanism operatively coupled to the seat bottom and engageable with the seat bottom to prevent rotation of the seat bottom;
a stopper operatively coupled to the seat base and engageable with the recline mechanism so as to prevent full forward rotation of the seat back during operation of the recline mechanism, the stopper also being disengageable from the recline mechanism so as to enable full forward rotation of the seat back during operation of the recline mechanism;
a tip-up actuator operatively coupled to the recline mechanism so as to operate the recline mechanism when the tip-up actuator is operated by a user, wherein the tip-up actuator is also operatively coupled to the seat bottom latch mechanism so as to disengage the seat bottom latch mechanism when the tip-up actuator is operated by a user, thereby enabling rotation of the seat bottom; and
a fold-down actuator operatively coupled to the recline mechanism so as to operate the recline mechanism when the fold-down actuator is operated by a user, and also operatively coupled to the stopper so as to disengage the stopper when the fold-down actuator is operated by the user, thereby enabling full forward rotation of the seat back.

16. A vehicle including a seat in accordance with claim 15.

17. The vehicle seat of claim 1 further comprising:
a second linkage structured to operatively couple the seat back to the seat bottom along a second side of the seat bottom opposite the first side of the seat bottom,
the second linkage including a first link rotatably coupled to the seat back at another first connection, and a second link rotatably coupled to the seat base at another second connection, the second linkage first link being rotatably coupled to the second linkage second link at another third connection,
the seat bottom being directly coupled to the second linkage first link at another fourth connection, the seat bottom being rotatable about the other fourth connection,
wherein the other third connection is structured to be movable with respect to the seat base responsive to rotation of the seat back about the seat back rotation axis.

* * * * *